United States Patent [19]

Fock et al.

[11] Patent Number: 5,086,142
[45] Date of Patent: Feb. 4, 1992

[54] COPOLYMER ACTING AS THICKENING AGENT FOR AQUEOUS PREPARATIONS HAVING A PH ABOVE 5.5, A METHOD FOR ITS PREPARATION AND ITS USE AS A THICKENING AGENT

[75] Inventors: Jürgen Fock, Düsseldorf; Eberhard Esselborn, Essen, both of Fed. Rep. of Germany

[73] Assignee: Th. Goldschmidt AG, Essen, Fed. Rep. of Germany

[21] Appl. No.: 648,571

[22] Filed: Jan. 31, 1991

Related U.S. Application Data

[63] Continuation-in-part of Ser. No. 544,335, Jun. 27, 1990, abandoned.

[30] Foreign Application Priority Data

Jul. 29, 1989 [DE] Fed. Rep. of Germany ....... 3925220

[51] Int. Cl.$^5$ .................. C08F 20/06; C08F 26/08; C08F 116/12
[52] U.S. Cl. .................. 526/318; 526/258; 526/260; 526/313; 526/317; 526/317.1; 526/318.2; 526/318.41; 526/318.5; 526/329.6; 526/333
[58] Field of Search ................ 526/318.5, 318, 329.6, 526/317

[56] References Cited
U.S. PATENT DOCUMENTS

| | | | |
|---|---|---|---|
| 4,338,239 | 7/1982 | Dammann | 526/318.5 |
| 4,384,096 | 5/1983 | Sonnabend | 526/313 |
| 4,892,916 | 1/1990 | Hawe | 526/304 |

*Primary Examiner*—Joseph L. Schofer
*Assistant Examiner*—Fred Zitomer
*Attorney, Agent, or Firm*—Toren, McGeady & Associates

[57] ABSTRACT

A copolymer is disclosed which acts as a thickening agent for aqueous preparations having a pH of more than 5.5. The copolymer is obtainable by emulsion polymerization in an aqueous medium, at a pH of 2.5 to 5, in the presence of an initiator forming free radicals, at a temperature of 60° to 95° C. of

- 10 to 50% by weight of acrylic or methacrylic acid,
- 25 to 75% by weight of a nonionic vinyl monomer and
- 2 to 50% by weight of a macromonomer of the formula $$CH_2=CR-CH_2-O-(C_nH_{2n}O)_a(C_mH_{2m}O)_b(C_pH_{2p}O)_cH$$

wherein
R is H or $CH_3$
n, p are the same or different and in each case are 2 or 3, with the proviso that n and p have a value of not more than 2.3 in the average molecule,
m = a whole number from 12 to 18
a = 10 to 100,
b = 2 to 10,
c = 0 to 10 and wherein the sum of the monomers amounts to 100% by weight.

4 Claims, No Drawings

COPOLYMER ACTING AS THICKENING AGENT FOR AQUEOUS PREPARATIONS HAVING A PH ABOVE 5.5, A METHOD FOR ITS PREPARATION AND ITS USE AS A THICKENING AGENT

This is a Continuation-in-Part of application Ser. No. 07/544,335, filed June 27, 1990 now abandoned.

BACKGROUND OF INVENTION

This invention relates to a copolymer which can be used as a thickening agent for aqueous preparations which have a pH above 5.5, to a method for its preparation and to its use as a thickening agent.

Polymers which thicken aqueous preparations as a function of the pH are known in the art.

In EP-A1 0 216 479, copolymers are described which are water soluble or water swellable in alkaline or acidic media, but which are insoluble or not swellable by water at a pH of 7. Such copolymers are prepared by the emulsion polymerization of:

a) 0 to 90% by weight of ethylenically unsaturated, ionic monomers, b) 0 to 90% by weight of ethylenically unsaturated, mainly nonionic monomers, c) 0.5 to 100% by weight of a ether of the formula

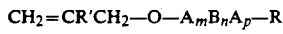

wherein R' is H or methyl, A is a propyleneoxy or butyleneoxy group, B is an ethyleneoxy group, n is equal to 0 or a whole number, usually 1 to 100, m and p are each 0 or a whole number less than n and R is a hydrophobic group with at least 8 carbon atoms and d) 0 to 5% by weight of a cross-linking monomer, preferably a copolymerizable, polyethylenically unsaturated monomer.

Usually, ionic monomers a) are vinyl compounds, particularly acrylic or methacrylic acid derivatives. In the case of the free acid, its share of component a) is 50 to 100%. The nonionic monomer b) contains a vinyl group and, as a rule, is an acrylate or styrene derivative. Preferably, 50 to 100% by weight of alkyl methacrylate is used as component b). The addition of the cross linking monomer d) is optional.

Of particular importance is the ether c) because, through the suitable selection of the values of n, m, p and R, it is possible to influence the properties of the product selectively. At the same time, an additional enhancement of the thickening effect is ascribed to the hydrophobic R group. As a rule, the ether contains a polyoxyethylene chain $B_n$ between the allyl group and the hydrophobic R group. Additional polyoxypropylene or polyoxybutylene groups, $A_m$ or $A_p$, can also be present in the molecule. The hydrophobic R group contains at least 8 carbon atoms. It may consist of a polyoxyalkylene chain of propylene oxide or butylene oxide; however, a long-chain hydrocarbon group is preferred. Accordingly, only the use of hydrocarbon groups is disclosed in the examples given in EP-A1 0 216 479.

In particular, hydrocarbon groups with 8 to 30 carbon atoms, such as octyl, lauryl or stearyl, aralkyl, such as 2-phenylethyl, aryl such as naphthyl, alkaryl, such as alkylphenyl or cycloalkyl groups are named.

It is pointed out particularly that the substituents on these groups must not under any circumstances adversely affect the hydrophobic character of the R group, otherwise the additional thickening action, which is brought about by the hydrophobic character of the R group, is lost.

Particularly preferred copolymers are those, which consist of 20 to 60% by weight of acrylic acid and/or methacrylic acid, 5 to 60% by weight of ethyl acrylate or other alkyl (meth)acrylates and 2 to 50% by weight of the allyl ether.

Moreover, copolymers are preferred which consist of 20 to 60% by weight of dialkylaminoalkyl (meth)acrylate or acrylamide, 5 to 60% by weight of ethyl acrylate or methyl methacrylate or other alkyl methacrylates and 2 to 50% by weight of the allyl ether.

The polymerization of components a), b), c) and d) yields an emulsion, in which the thickening agent is present in an insoluble and unswollen state. Only by the addition of alkali or acid is the desired thickening of the emulsion then achieved.

These copolymers can attain molecular weights far in excess of 0.5 million; as a rule, the molecular weights are between 1 and 5 million. Chain transfer agents are therefore added in order to limit the molecular weight to a range from 100,000 to 200,000, in which the desired properties are optimal.

The polymerization is carried out in an emulsion at a pH, at which the polymer is insoluble or is present in the unswollen state. In this way, the polymer can be isolated, for example, by removing it from the emulsion and drying it.

Frequently, however, the use of an aqueous dispersion of the polymer is advantageous. The emulsion can then be added to the solution that is to be thickened; the pH is adjusted to the value necessary to achieve the desired thickening effect by the addition of alkali, either before or after addition of the emulsion to the preparation, depending on the ionic monomer used.

The amount of thickener used is usually 0.05 to 5% by weight of the water content of the preparation that is to be thickened.

The copolymers ar of particular importance for the thickening of aqueous media which contain electrolytes or a dispersed phase. In particular, they are used to thicken paints, printing pastes for textiles, bleaching agents, alkaline liquors or paint removal preparations. Further important applications relate to the production of petroleum or of ores. In addition, they are used as filtration aids or flocculants.

However it has been ascertained that the thickening effects achieved are not adequate for all applications. Frequently, even better thickening effects are desired. At the same time however, the amount of the thickening agent added should remain as small as possible.

SUMMARY OF THE INVENTION

It is therefore an object of the invention to provide copolymers, the thickening properties of which are improved significantly at a pH of 5 or above.

Another object of the invention is to provide copolymers with improved thickening properties, by means of which it is possible to adjust viscosities to values higher than was previously possible or to achieve the same thickening effect with less thickener.

A further object of the invention is to provide copolymers with improved thickening properties which yield preparations having a low thixotropy index for special applications, so that preparations produced with the copolymers behave like Newtonian liquids.

Surprisingly, it has been discovered that these objectives are accomplished by means of a copolymer which is obtained by emulsion polymerization in an aqueous medium, at a pH of 2.5 to 5, in the presence of an initiator forming free radicals and at a temperature of 60° to 95° C. of:

10 to 50% by weight of acrylic or methacrylic acid,
25 to 75% by weight of a nonionic vinyl monomer and
2 to 50% by weight of a macromonomer of the general formula

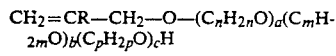

wherein
R is H or $CH_3$
n, p are the same or different and in each case are 2 or 3, with the proviso that n or p has a value of not more than 2.3 in the average molecule,
m = a whole number from 12 to 18
a = 10 to 100
b = 2 to 10,
c = 0 to 10 and
wherein the sum of the monomers amount to 100% by weight.

DESCRIPTION OF THE INVENTION

As monomers, acrylic acid, methacrylic acid or mixtures thereof can be used. In the comonomer mixture that is to be polymerized, acrylic acid or methacrylic acid or their mixtures are present in an amount of 10 to 50% by weight, based on the total weight of the comonomers, and preferably in an amount of 20 to 40% by weight; the nonionic vinyl monomer is used in an amount of 25 to 75% by weight.

Of particular importance for the properties of the inventive copolymers is the macromonomer of the general formula

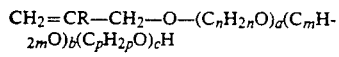

which is present in the monomer mixture in an amount of 2 to 50% by weight and preferably of 10 to 25% by weight. In the above formula, R is a hydrogen or methyl group. The macromonomer therefore is a polyoxyalkylene ether of allyl alcohol or methallyl alcohol and is distinguished, above all, by its hydrolytic stability.

The hydroxyl group of the allyl or methallyl alcohol has undergone an addition reaction with ethylene oxide or a mixture of ethylene oxide and propylene oxide. The subscript n thus has a value of 2 if the addition reaction was conducted with ethylene oxide and 3 if the addition reaction was conducted with propylene oxide. If a mixture of ethylene oxide and propylene oxide is used for the addition reaction, n assumes a fractional numerical value in the average molecule. Moreover, the condition must be fulfilled that, in the average molecule, the value of n does not exceed 2.3; that is, not more than 30 mole % of the ethylene oxide can be replaced by propylene oxide. The total number of the oxyethylene and oxypropylene units in the average molecule is 10 to 100 and preferably 25 to 60. If both oxyethylene and oxypropylene units are present, they can be distributed randomly or blockwise.

The macromonomers have a central or terminal block of oxyalkylene units with 12 to 18 carbon atoms. Preferably, the number of carbon atoms is 14 to 18. Moreover, 2 to 10 of these long-chain alkylene oxides have undergone an addition reaction with the macromonomer. Particularly preferred is the use of macromonomers which contain 2, 3 or 4 long-chain alkylene oxide units.

In addition, 0 to 10 oxyalkylene units can be reacted additively with the hydrophobic oxyalkylene units that have 12 to 18 carbon atoms so as to form hydrophobic end groups. The oxyalkylene can be ethylene oxide or propylene oxide or a mixture of the two.

A preferred copolymer of the invention comprises a nonionic vinyl monomer in the above composition which is an acrylate ester, vinyl ester or N-vinylpyrrolidone, wherein the ester groups of the acrylate and vinyl esters contain 1 to 4 carbon atoms. In particular, acrylate esters, such as the methyl, ethyl, propyl or butyl esters of acrylic acid are used. Vinyl acetate is a particularly suitable vinyl ester. These nonionic vinyl esters are used in an amount of 25 to 70% by weight, based on the comonomer mixture. The use of 40 to 70% by weight of the nonionic vinyl monomers in the mixture is preferred. Acrylamide, methacrylamide and styrene can also be used.

Particularly preferred is a copolymer of the invention which is obtained by using as the macromonomer, a compound of said general formula in which R = H, n = 2, m = 14 to 18, a = 25 to 60, b = 2, 3 or 4 and c = 1 to 5. With this composition, the inventive copolymer shows the best thickening effect in the respective preparations.

To those skilled in the art, it has been surprising than an allyl ether polyoxyalkylene, with a terminal block consisting of hydrophobic, long-chain alkylene oxide units with 12 to 18 carbon atoms in each case, produces an intensification of the thickening effect of the copolymer produced therewith, since, according to the state of the art, the particular thickening effect of the allyl ether comonomer is produced by hydrophobic end groups having at least 8 carbon atoms, which are formed either by alkylene oxide groups of 3 or 4 carbon atoms or preferably by alkyl groups. Unexpectedly, the thickening properties of the inventive copolymers, which are brought about by the introduction of these oxyalkylene units of 12 to 18 carbon atoms and particularly of 14 to 18 carbon atoms into the macromonomers, are clearly better than those brought about by the copolymers disclosed in the state of the art.

Even more surprising is the additional improvement in the thickening effect, when short, hydrophilic alkylene oxide groups are reacted in an addition reaction with the hydrophobic block of long-chain alkylene oxide units with 12 to 18 carbon atoms. In comparison to macromonomers which are provided with hydrophobic, long-chain oxyalkylene groups of 12 to 18 carbon atoms hydrophilic groups of 1 to 10 oxyethylene and/or oxypropylene units bring about a further increase in the thickening effect of 100%. This is especially surprising since, in the state of the art, an improvement in the thickening properties is attributed to the hydrophobic character of the end groups. In contrast to this, however, end groups having a hydrophilic character are produced here.

The copolymers of the invention ca be obtained by emulsion polymerization. The emulsion polymerization is carried out in an aqueous medium in the usual manner at a pH below 5 and, in particular, at a pH from 2.5 to 5. For this purpose, a free radical-forming initiator, such as peroxide compounds, and particularly inorganic persulfates, such as ammonium peroxydisulfate, is added to the aqueous medium. The polymerization temperature is 60° to 95° C. Usually, one or several emulsifiers are used to emulsify the monomer mixture or the resulting copolymer. Especially preferred is the use of a mixture of an anionic and a nonionic emulsifier, such as a mixture of alkali dodecylbenzene sulfonate and an oxyethylene ether of nonylphenol or tridecyl alcohol. Because of the water solubility of some monomers, initially the polymerization can also be carried out partially in solution.

The copolymerization is carried out in a manner with which those skilled in the art are familiar and is not an object of the present invention.

The emulsion polymerization results in a finely divided, stable dispersion of the copolymer. Advisably, comonomers are used in such amounts, that an approximately 10 to 30% by weight dispersion, based on the copolymer, is obtained. The copolymer dispersions have a high stability and can be marketed in concentrated form. At a pH up to 5, they have a low viscosity, which is practically the same as that of water.

The inventive copolymers obtained by emulsion polymerization have an average molecular weight of 30,000 to 2,000,000 and especially of 100,000 to 1,000,000; the molecular weights have been determined by gel chromatography.

If the pH of the dispersion is increased to a value above 5.5 by the addition of alkaline acting materials, such as sodium hydroxide solution or ammonium hydroxide solution, the milky dispersion is converted into a clear, colorless, highly viscous, colloidal solution of the copolymer. The viscosity of this solution depends on the structure of the inventive copolymer and, in particular, on the concentration of the inventive copolymer in the aqueous system. The inventive copolymers show a maximum thickening effect, when the comonomer mixture contains 25 to 35 mole percent of the $\alpha,\beta$-olefinically unsaturated carboxylic acids.

Of special influence is the nature and construction of the macromonomer contained in the comonomer mixture. In particular, the viscosity is affected by the number of the oxyethylene or oxypropylene units, the long-chain oxyalkylene units with 12 to 18 carbon atoms and especially by the terminal hydrophilic oxyalkylene units contained in the macromonomer. A maximum thickening action is achieved when the hydrophilic end group consists of 2 to 5 oxyalkylene units with 2 to 3 carbon atoms each.

The inventive copolymers are particularly suitable for the preparation of aqueous solutions or dispersions of paints, to which they are added as dispersions and which are then subsequently neutralized. Moreover, they find application in cosmetic preparations, as flocculants and in the production of petroleum.

The copolymers of the invention are effective even in very low concentrations. In general, the addition of 0.05 to 1% by weight of a copolymer of the invention, based on the total weight of the preparation, is sufficient to achieve the desired high viscosity at a pH of not less than 5.5.

A further object of the present invention is a method for thickening aqueous solutions, which comprises dispersing in an aqueous preparation to be thickened a copolymer obtainable by emulsion polymerization in an aqueous medium, at a pH of 2.5 to 5, in the presence of an initiator forming free radicals, at a temperature of 60° to 95° C. of 10 to 50% by weight of acrylic or methacrylic acid, 25 to 75% by weight of a nonionic vinyl monomer and 2 to 50% by weight of a macromonomer of the formula

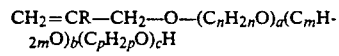

$$CH_2=CR-CH_2-O-(C_nH_{2n}O)_a(C_mH_{2m}O)_b(C_pH_{2p}O)_cH$$

wherein

R is H or $CH_3$ n and p are the same or different and in each case are 2 or 3, with the proviso that n and p have a value of not more than 2.3 in the average molecule, m = a whole number from 10 to 18 a = 10 to 100, b = 2 to 10, c = 0 to 10, and wherein the sum of the monomers amounts to 100% by weight and adjusting the pH of the aqueous preparation to a value of at least 5.5 by the addition of an alkaline reacting substance.

When the pH is adjusted, it turns out that the alkali counter ions lead to high thixotropy indexes. On the other hand, this effect is eliminated if polyamines, and especially long-chain polyamines are used for the neutralization.

Particularly preferred, therefore, is a method in which polyamines or aminofunctional polyoxyalkylenes are used as alkaline reacting substance.

Especially preferred in this connection is a method in which aminofunctional polyoxyalkylenes of glycerin or trimethylolpropane are used as alkaline reacting substances. In these compositions, the terminal OH groups are replaced by $NH_2$ groups.

Glycerin or trimethylolpropane, for example, is used as the starting alcohol for the preparation of these polyoxyalkylene amines. The starting alcohol is reacted with alkylene oxide and then functionalized by aminolysis with ammonia. As alkylene oxides, ethylene oxide as well as propylene oxide or mixtures of the two can be used. Such aminofunctional polyalkylene oxides have an average molecular weight of 100 to 2,000 and contain 2 to 50 alkylene oxide units.

If polyoxyalkylene amines are used to adjust the value of the pH, the thickened preparations behave at least approximately like Newtonian liquids; that is, the thixotropy index is reduced by the use of the amines for the neutralization.

A further object of the invention relates to the use of the copolymers as thickening agents in aqueous preparations having a pH of not less than 5.5 in an amount of 0.05 to 5% by weight, based on the weight of the preparation.

The inventive copolymers are very effective even when added in small amounts and enable the amount of thickening agent usually employed to be reduced while keeping the thickening effect the same. For example, the addition of less than 1% by weight of the inventive copolymer is, as a rule, sufficient to achieve the desired thickening effect.

Moreover, by using the inventive copolymers, it is also possible to convert the aqueous preparations into gels which can be cut. For this, the amount of copolymer required is clearly less than quantities required according to the state of the art.

The following examples of the preparation of copolymers of the invention and their thickening properties further illustrate the best mode currently contemplated for carrying out the invention, but the illustrative examples must not be considered to limit the invention in any manner.

Synthesis of an Allyl Polyether Macromonomer

Allyl alcohol (116 g, approximately 2 moles) and 14 g of potassium methylate (approximately 0.2 moles) are carefully flushed with pure nitrogen in a pressure reactor with a forced circulation system and heated to 110° C. After that, 4,400 g (approximately 100 moles) of ethylene oxide are added at such a rate, that the internal temperature of the reactor does not exceed 120° C. and the internal pressure of the reactor does not exceed 6 bar. When the addition of ethylene oxide is completed, the temperature is maintained at 115° C., until a constant pressure indicates the end of the reaction. Subsequently, 960 g (approximately 4 moles) of hexadecene-1-oxide are added and the reactor is heated for 2 hours at 120° C. In a last step, 440 g (approximately 10 moles) of ethylene oxide are introduced once again and heated once more at 115° C., until the pressure reaches a constant value. Finally, the remaining monomers are removed at 80° to 90° C. under vacuum. The reaction product is neutralized with phosphoric acid, the water removed by vacuum distillation and the sodium phosphate formed filtered off with the help of a filter aid.

The hydroxyl number of the product is 23.2; assuming a functionality of 1, this hydroxyl number corresponds to a molecular weight of 2420. The double bond content, obtained from the determination of the iodine number, corresponds to a content of 82 mole percent.

Further allyl polyetherols are synthesized in the same manner. The composition and molecular weights of the allyl polyetherols produced are given in Table 1. The alkylene oxides are listed from left to right in agreement with the sequence of the alkoxylation of the allyl alcohol, with the exception that ethylene oxide and propylene oxide can also be reacted as a mixture in the first step of the addition reaction. The molecular weight given is obtained by determining the hydroxyl number and by assuming a functionality of 1.

Copolymerization of an Allyl Polyether Macromonomer with Methacrylic Acid and Methylacrylate in an Aqueous Emulsion (of the Invention)

An emulsion is prepared under nitrogen with a high-shear stirrer from 240 g (approximately 0.106 moles) of the allyl polyether macromonomer 1 A, 130 g of the ammonium salt of an octylphenol polyethylene glycol sulfonate with 9 ethylene oxide units, 360 g (approximately 3.9 moles) of methacrylic acid, 640 g (approximately 7.4 moles) of methyl acrylate and 3,000 g of degassed, deionized water. The emulsion obtained is added over a period of 2 to 3 hours to 2,100 g of degassed, deionized water, which contains 20 g of a 5% aqueous solution of potassium peroxydisulfate. The temperature of the reaction batch is 80 to 85° C. After the complete addition of the emulsion, 28 g of a 5% solution of potassium peroxydisulfate are once again added to the emulsion and the temperature is kept at 85° C. for a further 2 hours.

After filtration, the thus prepared dispersion has a solids content of about 20% by weight and a residual monomer content of less than 0.01% by weight. The viscosity of the dispersion is about 5 mPas and the pH is 4.

By addition of water, the dispersion is diluted to a solids content of 1%. After addition of 10% aqueous ammonia until the pH has a value of 9, a clear solution with a viscosity of more than $10^6$ mPas (Brookfield viscosimeter, LV2 spindle at 3 rpm) is obtained.

The polymerization is carried out in the same manner using allyl polyether macromonomers 2 A to 24 A to produce polymers 2 B to 40 B. In addition, the amounts used are different. The amounts of methylacrylate and methacrylic acid used are also not the same.

The dispersions obtained are diluted with water to a solids content of 1 to 0.25% by weight; after addition of 10% aqueous ammonia, the viscosity is determined with a Brookfield viscosimeter (LV2 spindle at 3 rpm). The thixotropy index is obtained from the ratio of the viscosities at 3 and 30 rpm. The composition and the viscosity increasing effect of the emulsion polymers are shown in Table 2 A.

Copolymerization of Allyl Polyether Macromonomers 1 A, 5 A and 13 A with Different Unsaturated Carboxylic Acids and Vinyl Monomers The procedure as described above is followed, with the difference that, aside from methacrylic acid, acrylic acid and various vinyl monomers in different amounts are also used. The composition of the copolymers and their thickening effect after neutralization with aqueous ammonium hydroxide are described in Table 2 B.

Key: AS acrylic acid
MAS methacrylic acid
MA methyl acrylate
EA ethyl acrylate
BA butyl acrylate
VAC vinyl acetate
NVP N-vinylpyrrolidone
AAM acrylamide
BDDA butanediol diacrylate Determination of the Viscosity Index of Different Emulsion Polymers Upon Neutralization with an Aminofunctional Polyether After dilution of emulsion polymers 1 B, 4 B, 5 B, 16 B and 17 B to a solids concentration of 0.25% by weight, the pH was increased to a value of 9 with the help of an aminofunctional polypropylene oxide with a functionality, based on the amino groups, of 3 and a molecular weight of about 400 (Jeffamin T 4000 of the Deutsche Texaco Co.). The composition of the copolymers and the viscosities as measured with the Brookfield viscosimeter at 23° C. with the LV2 spindle at 3 and 30 rpm, are shown in Table 3.

TABLE 1

| According to the invention Yes = Y No = N | Allyl-polyetherol No. | Ethylene Oxide (moles) | Propylene Oxide (moles) | α-Olefin Epoxide C-No. | moles | Ethylene Oxide (moles) | Molecular weight from OH-No. |
|---|---|---|---|---|---|---|---|
| Y | 1 A | 50 | — | 16 | 2 | 5 | 2420 |
| Y | 2 A | 50 | — | 12 | 2 | — | 2100 |
| Y | 3 A | 50 | — | 12 | 2 | 5 | 2250 |

TABLE 1-continued

| According to the invention Yes = Y No = N | Allyl-polyetherol No. | Ethylene Oxide (moles) | Propylene Oxide (moles) | α-Olefin Epoxide C-No. | moles | Ethylene Oxide (moles) | Molecular weight from OH-No. |
|---|---|---|---|---|---|---|---|
| Y | 4 A  | 50  | — | 14 | 2 | — | 2600 |
| Y | 5 A  | 50  | — | 14 | 2 | 5 | 2740 |
| Y | 6 A  | 50  | — | 14 | 4 | — | 2500 |
| Y | 7 A  | 50  | — | 14 | 4 | 5 | 2620 |
| Y | 8 A  | 42  | 6 | 14 | 2 | — | 2440 |
| Y | 9 A  | 42  | 6 | 14 | 2 | 5 | 2570 |
| Y | 10 A | 50  | — | 16 | 2 | — | 2270 |
| Y | 11 A | 50  | — | 16 | 2 | 1 | 2300 |
| Y | 12 A | 50  | — | 16 | 2 | 2 | 2320 |
| Y | 13 A | 50  | — | 16 | 3 | 5 | 2520 |
| Y | 14 A | 50  | — | 14 | 5 | 5 | 2770 |
| Y | 15 A | 10  | — | 16 | 2 | 5 | 1100 |
| Y | 16 A | 100 | — | 16 | 2 | 5 | 4250 |
| Y | 17 A | 50  | — | 18 | 2 | — | 2460 |
| Y | 18 A | 50  | — | 18 | 2 | 5 | 2630 |
| N | 19 A | 50  | — | *4*  | 7 | 2 | 2120 |
| N | 20 A | 50  | — | *8*  | 2 | 3 | 2360 |
| N | 21 A | 50  | — | *10* | 2 | 5 | 2400 |
| N | 22 A | 25  | *19* | 14 | 2 | — | 2160 |
| N | 23 A | 25  | *19* | 14 | 2 | 5 | 2300 |
| N | 24 A | 50  | — | 16 | *1* | 5 | 2430 |

The values in italic characters are outside the scope of the claims.

TABLE 2 A

| According to the invention Yes = Y No = N | Copolymer No. | Allylpolyetherol No. | % by weight | Methacrylic Acid % by weight | Methylacrylate % by weight | Viscosity (mPas) 1% | 0,25% | Thixotropy Index |
|---|---|---|---|---|---|---|---|---|
| Y | 1 B  | 1 A  | 19,4 | 29,0 | 51,6 | $10^6$ | — | — |
| Y | 2 B  | 2 A  | 15 | 27,5 | 57,5 | $2,2.10^5$ | 1330 | — |
| Y | 3 B  | 3 A  | 15 | 27,5 | 57,5 | $4,3.10^5$ | 2780 | — |
| Y | 4 B  | 4 A  | 15 | 27,5 | 57,5 | $>10^6$ | 6200 | 5,2 |
| Y | 5 B  | 5 A  | 15 | 27,5 | 57,5 | $>10^6$ | 9950 | 6,4 |
| Y | 6 B  | 6 A  | 15 | 27,5 | 57,5 | $>10^6$ | $>10^5$ | 6,0 |
| Y | 7 B  | 7 A  | 15 | 27,5 | 57,5 | $>10^6$ | 6800 | 5,9 |
| Y | 8 B  | 8 A  | 15 | 27,5 | 57,5 | $>10^6$ | 5100 | 6,1 |
| Y | 9 B  | 9 A  | 15 | 27,5 | 57,5 | $>10^6$ | $>10^5$ | 5,6 |
| Y | 10 B | 11 A | 15 | 27,5 | 57,5 | $>10^6$ | 6100 | 4,3 |
| Y | 11 B | 12 A | 15 | 27,5 | 57,5 | $>10^6$ | 7200 | 4,7 |
| Y | 12 B | 13 A | 15 | 27,5 | 57,5 | $>10^6$ | 8300 | 6,2 |
| Y | 13 B | 14 A | 15 | 27,5 | 57,5 | $6,3.10^5$ | 3500 | 5,0 |
| Y | 14 B | 15 A | 15 | 27,5 | 57,5 | $2,1.10^5$ | 1350 | 3,5 |
| Y | 15 B | 16 A | 15 | 27,5 | 57,5 | $>10^6$ | 8550 | 5,3 |
| Y | 16 B | 17 A | 15 | 27,5 | 57,5 | $3,7.10^5$ | 2100 | 5,6 |
| Y | 17 B | 18 A | 15 | 27,5 | 57,5 | $7,8.10^5$ | 4000 | 6,0 |
| Y | 18 B | 10 A | 15 | 27,5 | 57,5 | $>10^6$ | 4900 | 5,5 |
| N | 19 B | *19 A* | 15 | 27,5 | 57,5 | 30* | — | — |
| N | 20 B | *20 A* | 15 | 27,5 | 57,5 | 150* | — | — |
| N | 21 B | *21 A* | 15 | 27,5 | 57,5 | 255* | — | — |
| N | 22 B | *22 A* | 15 | 27,5 | 57,5 | 1840* | — | — |
| N | 23 B | *23 A* | 15 | 27,5 | 57,5 | 3200* | — | — |
| N | 24 B | *24 A* | 15 | 27,5 | 57,5 | 120* | — | — |

The values in italic characters are outside the scope of the claims.
The viscosity values have been measured with a LV2 spindle of the Brookfield viscosimeter.
The viscosity values marked with * have been measured with a LV3 spindle of the Brookfield viscosimeter.

TABLE 2 B

| According to the invention Yes = Y No = N | Copolymer No. | Allylpolyetherol No. | % by weight | Unsaturated Carboxylic Acid Type | % by weight | Vinyl Monomer Type | % by weight | Viscosity (mPas) 1% | 0,25% | Thixotropy Index |
|---|---|---|---|---|---|---|---|---|---|---|
| Y | 25 B | 5 A  | 4  | MAS | 27,5 | MA      | 68,5      | $1,7.10^5$ | 900 | 2,8 |
| Y | 26 B | 5 A  | 6  | MAS | 27,5 | MA      | 66,5      | $>10^6$ | 4800 | 3,5 |
| Y | 27 B | 5 A  | 10 | MAS | 27,5 | MA      | 62,5      | $>.10^6$ | 5000 | 5,7 |
| Y | 28 B | 5 A  | 20 | MAS | 27,5 | MA      | 52,5      | $>.10^6$ | $>10^5$ | 5,5 |
| Y | 29 B | 5 A  | 40 | AS  | 27,5 | MA      | 32,5      | $5,5.10^5$ | 3000 | — |
| Y | 30 B | 1 A  | 15 | MAS | 10,0 | MA      | 75,0      | $1,3.10^5$ | 780 | 4,2 |
| Y | 31 B | 1 A  | 15 | MAS | 20,0 | MA      | 65,0      | $>.10^6$ | 7700 | 5,2 |
| Y | 32 B | 1 A  | 15 | MAS | 45,0 | MA      | 40,0      | $3,1.10^5$ | 5600 | 4,1 |
| Y | 33 B | 13 A | 20 | MAS | 40,0 | EA      | 40,0      | $7,5.10^4$ | — | — |
| Y | 34 B | 13 A | 20 | MAS | 40,0 | VAC     | 50,0      | $3,0.10^4$ | — | — |
| Y | 35 B | 13 A | 20 | MAS | 27,5 | BA/NVP  | 34,5/23,0 | $1,0.10^5$ | — | — |
| Y | 36 B | 13 A | 15 | MAS | 27,5 | MA/AAM  | 47,5/10,0 | $1,5.10^5$ | 880 | — |
| Y | 37 B | 13 A | 15 | MAS | 27,5 | MA/BDDA | 57,3/0,2  | $>.10^6$ | 5000 | 5,0 |
| N | 38 B | 5 A  | *60* | MAS | 27,5 | MA      | 12,5      | 2 | — | — |
| N | 39 B | 13 A | 15 | MAS | *5,0* | MA     | 80,0      | 35 | <5 | — |

TABLE 2 B-continued

| According to the invention Yes = Y No = N | Copolymer No. | Allylpolyetherol No. 0 | Allylpolyetherol % by weight | Unsaturated Carboxylic Acid Type | Unsaturated Carboxylic Acid % by weight | Vinyl Monomer Type | Vinyl Monomer % by weight | Viscosity (mPas) 1% | Viscosity (mPas) 0,25% | Thixo- tropy Index |
|---|---|---|---|---|---|---|---|---|---|---|
| N | 40 B | 13 A | 15 | MAS | *60,0* | MA | 25,0 | 1600 | — | — |

The values in italic characters are outside the scope of the claims.

TABLE 3

| According to the invention Yes = Y No = N | Copolymer No. | Allylpolyetherol No. | Allylpolyetherol % by weight | Methylacrylic Acid % by weight | Methylacrylate % by weight | Viscosity (mPas) 0,25% | Thixotropy Index |
|---|---|---|---|---|---|---|---|
| Y | 1 B | 1 A | 15 | 27,5 | 57,5 | 1000 | 2,1 |
| Y | 4 B | 4 A | 15 | 27,5 | 57,5 | 980 | 1,5 |
| Y | 5 B | 5 A | 15 | 27,5 | 57,5 | 2600 | 2,3 |
| Y | 16 B | 17 A | 15 | 27,5 | 57,5 | 1700 | 1,9 |
| Y | 17 B | 18 A | 15 | 27,5 | 57,5 | 2820 | 2,8 |

From this table it can be seen that products according to the invention have very low thixotropic indices. Aqueous solutions containing the inventive thickeners are showing approximately the behaviour of Newton liquids.

We claim:

1. A copolymer obtainable by emulsion polymerization in an aqueous medium, at a pH of 2.5 to 5, in the presence of an initiator forming free radicals, at a temperature of 60° to 95° C. of
   10 to 50% by weight of acrylic or methacrylic acid
   5 to 75% by weight of a nonionic vinyl monomer and
   2 to 50% by weight of a macromonomer of the formula $$CH_2=CR-CH_2-O-(C_nH_{2n}O)_a(C_mH_{2m}O)_b(C_pH_{2p}O)_cH$$

wherein
   R is H or $CH_3$
   n and p are the same or different and in each case are 2 or 3, with the proviso that n and p have a value of not more than 2.3 in the average molecule,
   m = a whole number from 12 to 18
   a = 10 to 100,
   b = 2 to 10,
   c = 0 to 10, and
   wherein the sum of the monomers amounts to 100% by weight.

2. The copolymer of claim 1, wherein the nonionic vinyl monomer is selected from an acrylate ester with 1 to 4 carbon atoms in the alcohol group or a vinyl ester with 1 to 4 carbon atoms in the acid group a N-vinylpyrrolidone or any combination thereof.

3. The copolymer of claim 1, wherein the macromonomer is a compound of the formula $$CH_2=CR-CH_2-O-(C_nH_{2n}O)_a(C_mH_{2m}O)_b(C_pH_{2p}O)_cH$$

wherein
   R = H,
   n = 2,
   p = 2,
   m = 14 to 18,
   a = 25 to 60,
   b = 2, 3, or 4 and
   c = 1 to 5.

4. The copolymer of claim 2, wherein the macromonomer is a compound of the formula $$CH_2=CR-CH_2-O-(C_nH_{2n}O)_a(C_mH_{2m}O)_b(C_pH_{2p}O)_cH$$

wherein
   R = H,
   n = 2,
   p = 2,
   m = 14 to 18,
   a = 25 to 60,
   b = 2, 3, or 4 and
   c = 1 to 5.

* * * * *